May 26, 1942.  E. V. RIPPINGILLE  2,284,589
MARINE DRIVE AND REVERSE GEAR
Filed Feb. 6, 1939     5 Sheets-Sheet 1
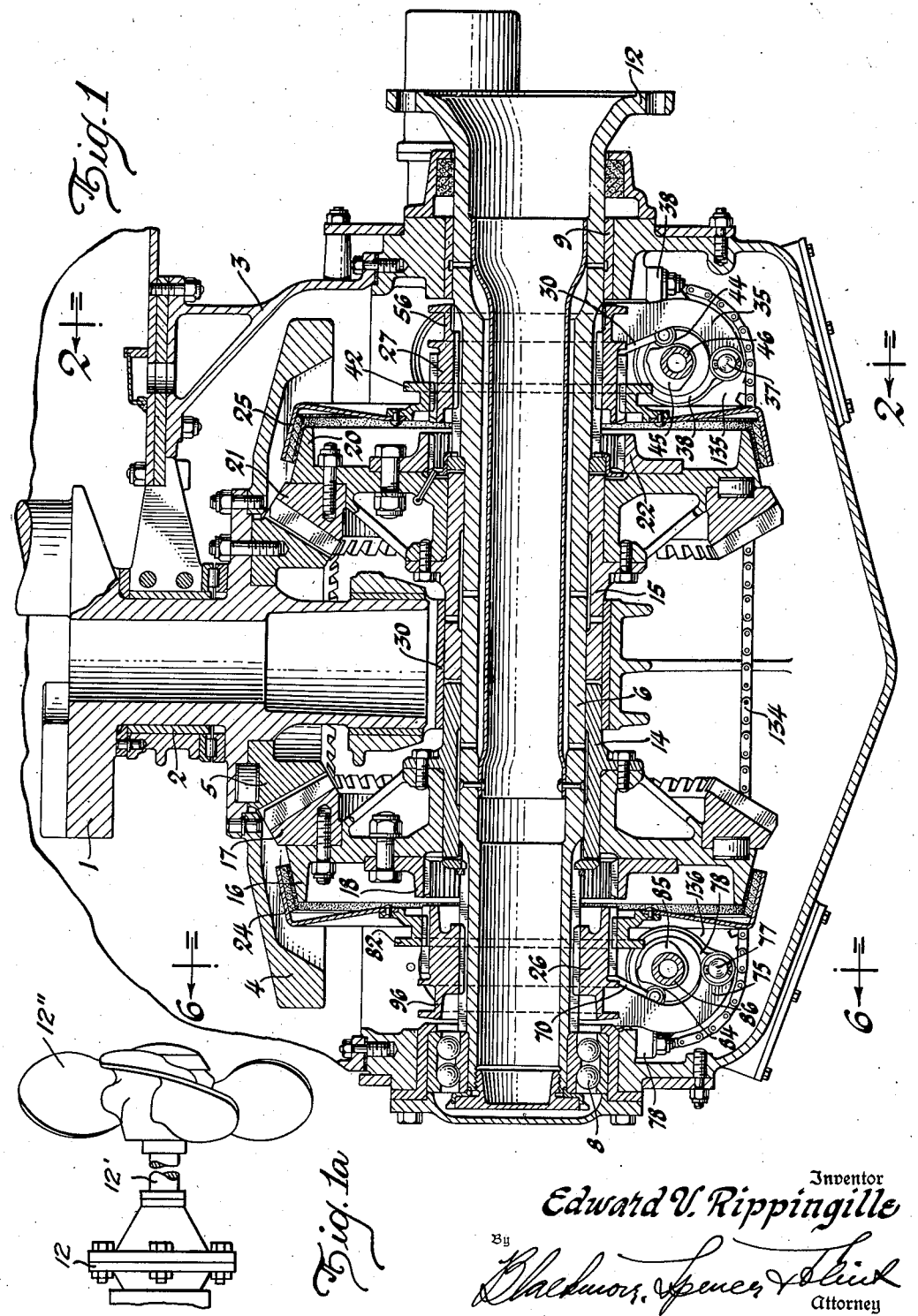
Inventor
Edward V. Rippingille
By
Attorney

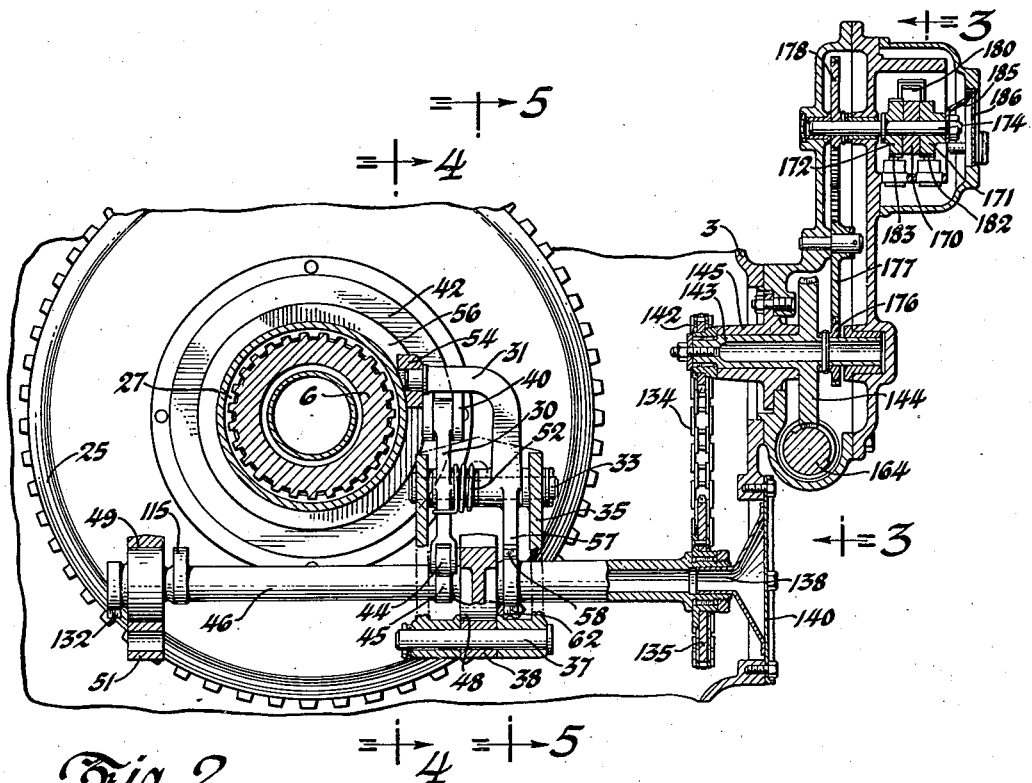
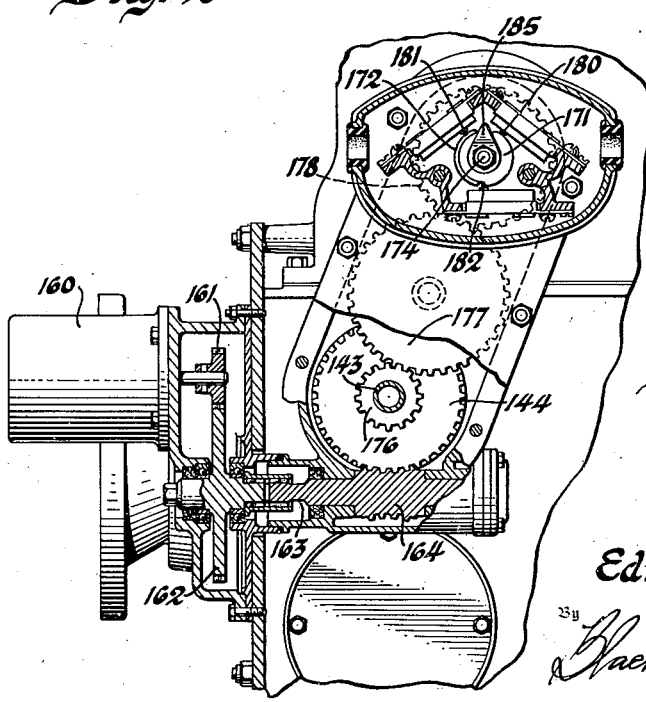

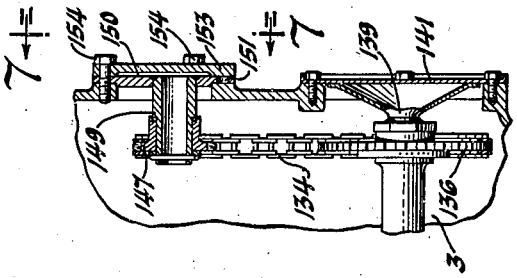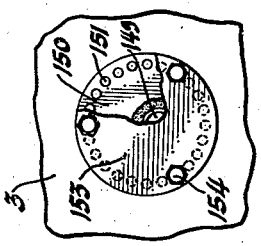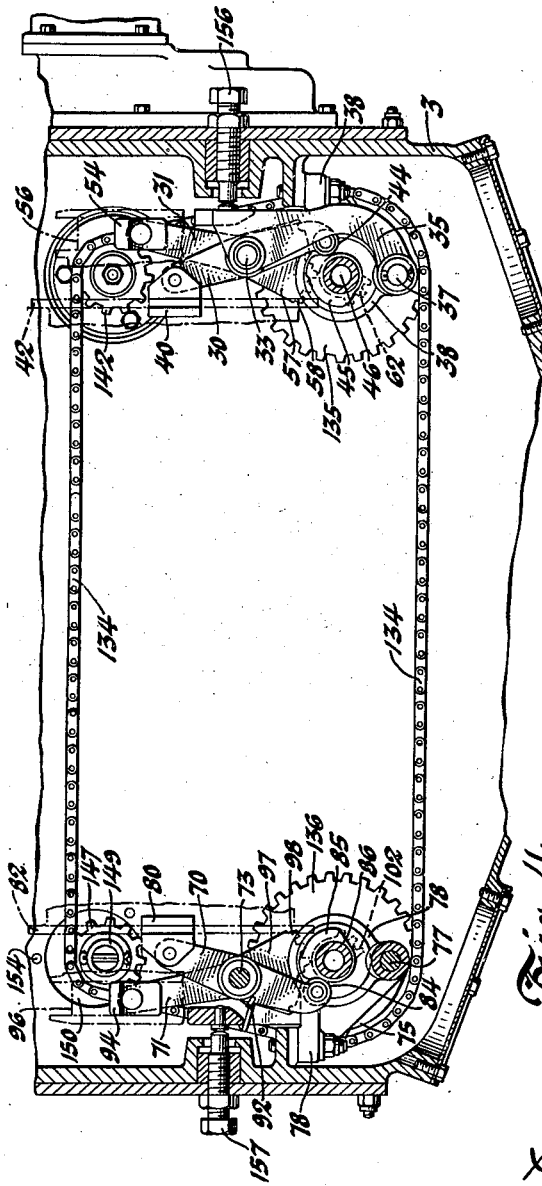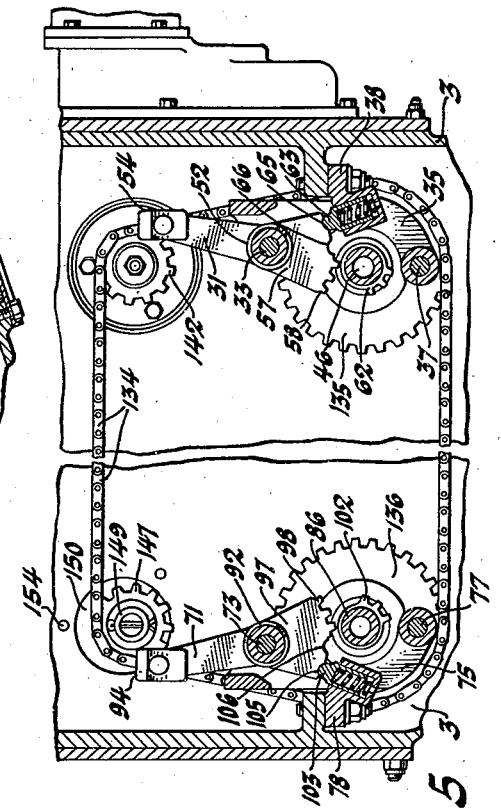

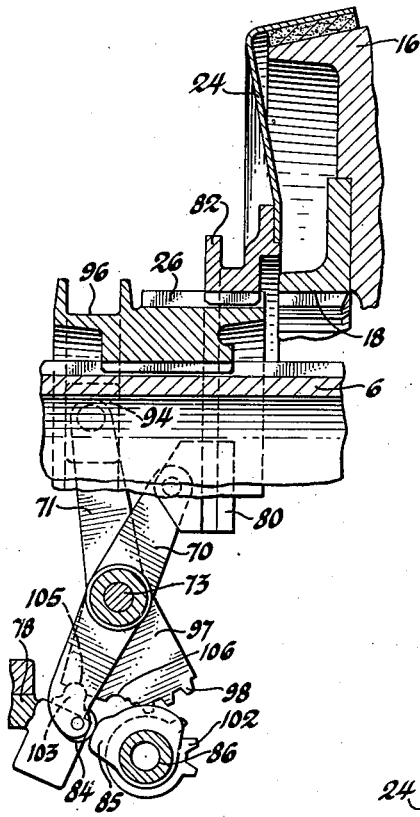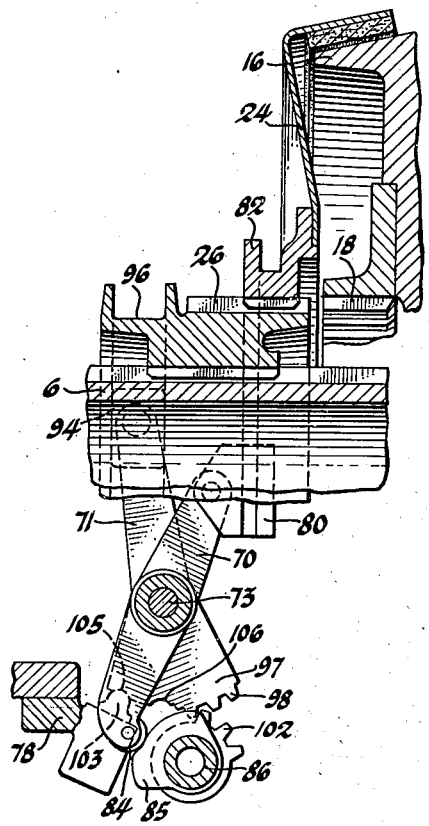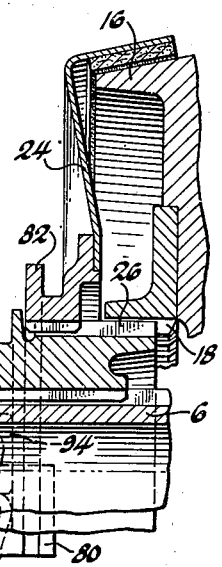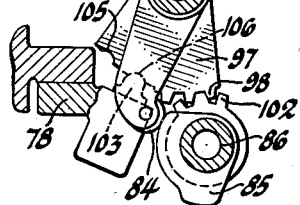

May 26, 1942.  E. V. RIPPINGILLE  2,284,589
MARINE DRIVE AND REVERSE GEAR
Filed Feb. 6, 1939  5 Sheets-Sheet 5
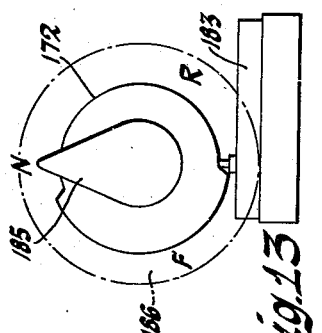
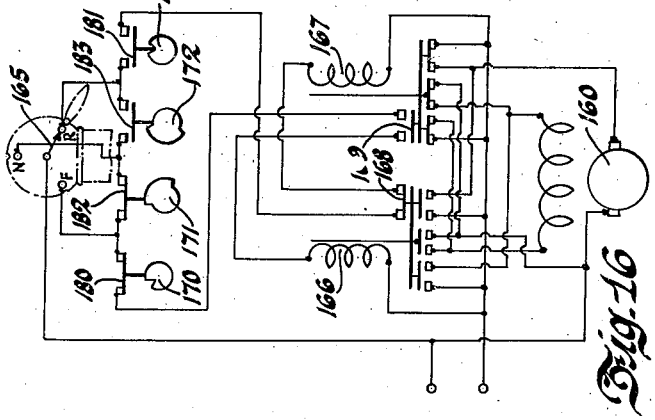
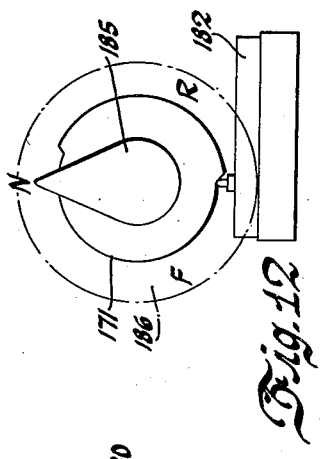
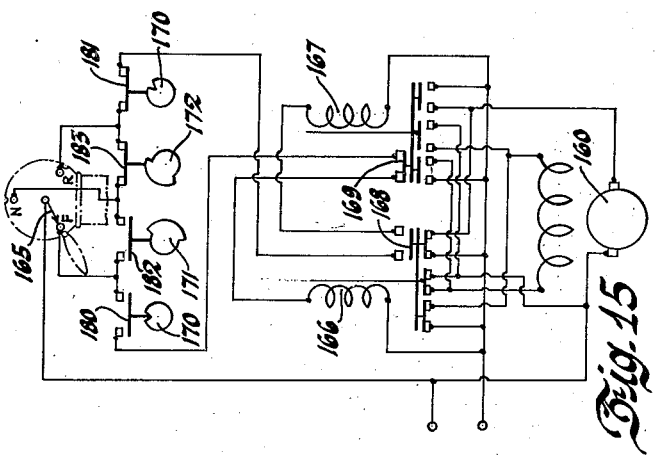
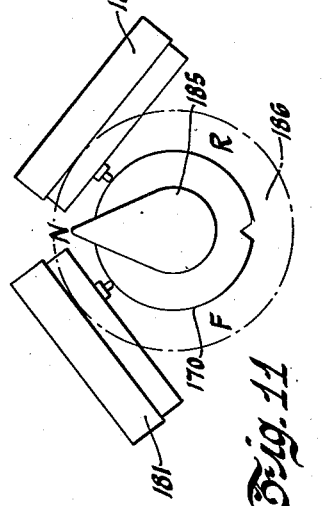
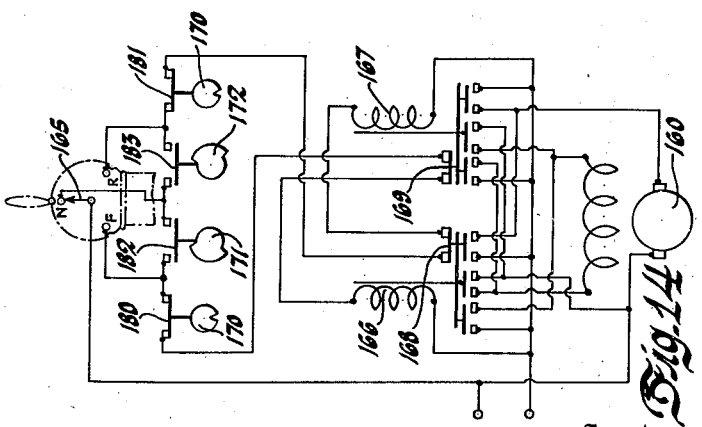
Inventor
Edward V. Rippingille
By
Attorneys Patented May 26, 1942

2,284,589

UNITED STATES PATENT OFFICE 2,284,589

MARINE DRIVE AND REVERSE GEAR

Edward V. Rippingille, Detroit, Mich., assignor to General Motors Corporation, Detroit, Mich., a corporation of Delaware Application February 6, 1939, Serial No. 354,893

5 Claims. (Cl. 115—34)

This invention relates to a gearing for transmitting a forward or reverse drive to a driven shaft, from an engine having a driving shaft rotating only in one direction. It relates especially to a marine drive and reverse gear in which the engine crankshaft is at right angles to the propeller shaft.

One object of the invention is a forward and reverse gear having constant mesh bevel wheels driven in opposite directions by a bevel wheel on the engine crankshaft, with friction synchronizing and dog clutch means for transmitting the drive from one or the other of the driven bevel wheels, to a propeller shaft.

Another object of the invention is a combined shifting mechanism for the forward and reverse drive clutches, which will be without influence on the reverse drive clutches when the forward drive cltuches are being engaged or disengaged, and vice versa.

A further object of the invention is a shifting mechanism which first fully engages the synchronizing clutch to bring the driving shaft to the speed of the propeller shaft, and then slightly releases the synchronizing clutch to allow creeping of the dog clutch members relatively to each other, to facilitate engagement thereof.

A still further object of the invention is an electric servo-motor control means for the clutches, whereby the various changes between "neutral," "forword," and "reverse" drive, may be effected by the movement of a simple three-way switch.

The above and other objects of the invention will be apparent as the description proceeds.

The drawings show the drive from the vertically disposed crankshaft of an internal combustion engine, to a propeller shaft disposed perpendicularly thereto.

In the drawings:

Fig. 1 is a vertical sectional view longitudinally of the propeller shaft.

Fig. 1a shows a propeller mounted on an extension of the propeller shaft.

Fig. 2 is a partly broken away sectional view on line 2—2 of Fig. 1, and showing the mechanical part of the electric control and driving means for shifting the clutches.

Fig. 3 is a part sectional view of a part of Fig. 2, on line 3—3 of Fig. 2.

Fig. 4 is a part sectional view on line 4—4 of Fig. 2.

Fig. 5 is a sectional view with part broken away, on line 5—5 of Fig. 2.

Fig. 6 is a part sectional view of a part, on line 6—6 of Fig. 1.

Fig. 7 is a part broken away view, on line 7—7 of Fig. 6.

Figs. 8 to 10 are enlarged, somewhat diagrammatic views, showing various positions of the reverse synchronizing and dog clutches, respectively.

Figs. 11, 12 and 13, show diagrammatically, the relative position in "neutral," of cams shown in Figs. 2 and 3, which automatically control the circuits of the electric motor control means for the clutches.

Figs. 14, 15 and 16 are schematic diagrams of the motor control circuit, in "neutral," "forward," and "reverse" positions, respectively.

As shown most clearly in Fig. 1, the engine crankshaft 1 is vertically disposed and supported in bearings such as 2, in the engine frame 3.

Mounted on the lower end of the crankshaft 1, is a flywheel 4, and a bevel wheel 5 which is shrouded by the flywheel.

Below the crankshaft 1, is a tubular propeller shaft 6, with its axis at right angles to the axis of the crankshaft. The propeller shaft 6 is supported at one end in a double thrust ball bearing 8, and at the other end in a plain bearing 9, in the engine frame. A coupling flange 12 is provided at one end of the propeller shaft, for an extension 12' thereof on which is mounted a propeller 12".

Sleeved over the propeller shaft, are a pair of tubular members 14 and 15. Secured to the member 14, are a cone clutch member 16, a bevel wheel 17, and a dog clutch member 18. A cone clutch member 20, a bevel wheel 21, and a dog clutch member 22, are similarly secured to the member 15.

The bevel wheels 17 and 21, are in mesh with the bevel wheel 5 at diametrically opposite points thereof, and hence are driven in opposite directions thereby.

Coacting with the cone clutch members 16 and 20, and the dog clutch members 18 and 22 respectively, of the bevel wheels 17 and 21, are cone clutch members 24 and 25, and dog clutch members 26 and 27 respectively. The dog clutch members 26 and 27 are splined to the propeller shaft 6, and the cone clutch members 24 and 25 are splined respectively to the dog clutch members 26 and 27.

A bearing 30 surrounds the two sleeves 14 and 15, and through them, supports the propeller shaft 6 intermediately of its bearings 8 and 9.

The cone clutches 16, 24, and 20, 25, are friction clutches for synchronizing the speeds of the shaft 6 and the bevel wheels 17 and 21, to facilitate the engagement of the positive dog clutches 18, 26, and 22, 27, respectively.

Accordingly as one or the other of the bevel wheels 21 and 17 is in clutch engagement with the shaft 6, the latter turns in one direction or the other. It will be assumed hereafter that the bevel wheel 21 turns the shaft 6 in a "forward" direction, and the bevel wheel 17 turns it in a "reverse" direction.

The direction of rotation of the engine crankshaft and the helical hand of the propeller, are such that the thrust axially of the shaft 6 between the bevel wheel 5 and either of the bevel wheels 17 and 21, is in each instance in an opposite direction to the thrust of the propeller in either a "forward" or "reverse" direction, thereby very materially reducing the need for other means of taking these thrusts.

Thus, assuming clockwise rotation of the crankshaft 1 (as seen from above in Fig. 1), a propeller with a left hand helix as shown in Figure 1a, connected to the coupling flange 12, will give a thrust to the left when driven through the bevel wheel 21, and a thrust to the right when driven through the bevel wheel 17; a propeller with a right hand helix will give a thrust to the right when driven through the bevel wheel 21 and a thrust to the left when driven through the bevel wheel 17.

With clockwise rotation of the crankshaft 1, the thrust in either direction of a propeller with a left hand helix will be balanced to a considerable extent by the thrust between the bevel wheels 17 or 21, and 5, of its driving means; a propeller with a right hand helix would require anti-clockwise rotation of the crankshaft 1 (as seen from above) for this condition to be satisfied.

As best shown in Figs. 2, 4 and 5, movement of the synchronizing clutch member 25 and the dog clutch member 27, to effect engagement and disengagement of the "forward" drive clutches, is effected by levers such as 30 and 31 respectively. The levers 30 and 31 are fulcrumed intermediately of their ends, on a pin 33, in a bracket 35 which is pivotable about a pin 37 in a bracket 38, of the engine frame.

One end of the lever 30, has pivotally connected thereto, a shoe 40 embracing a flange 42 on the boss of the synchronizing clutch member 25. The other end of the lever 30 is provided with a roller follower 44 for a cam 45 on a tubular shaft 46 extending transversely of the shaft 6, and supported in suitable bearings 48 and 49 respectively, in the bracket 38 and a similar bracket 51 spaced from the bracket 38, on the engine frame. The lever 30 is yieldingly held with its roller 44 against the cam 45, by a torsion coil spring 52.

One end of the lever 31 has pivotally connected thereto a shoe 54 engaging an annular groove 56 in the outer circumference of the dog clutch 27. The other end of the lever 31 is in the form of a sector 57 having a number of teeth 58 adapted to be engaged by the teeth of a gear segment 62 on the shaft 46, and capable only of moving the sector 57 through a part of a revolution in either direction. A spring loaded detent 63 is mounted in the bracket 38 on the engine frame, and tends to hold the lever 31 and with it the dog clutch 27 in a disengaged or in engaged position, accordingly as it engages one or the other of two depressions 65 and 66, spaced from each other on the periphery of the sector 57.

Movement of the synchronizing clutch member 24 and the dog clutch member 26, to effect engagement and disengagement of the reverse clutches, is effected by levers such as 70 and 71 and associated parts, which are similar if not identical with the levers such as 30 and 31 and their associated parts thus far described. The levers 70 and 71 are fulcrumed intermediately of their ends, on a pin 73 in a bracket 75, which is pivotable about a pin 77 in a bracket 78 of the engine frame.

One end of the lever 70 has pivotally connected thereto a shoe 80, embracing a flange 82 on the boss of the synchronizing clutch member 24. The other end of the lever 70 is provided with a roller follower 84, for a cam 85 on a tubular shaft 86 extending transversely of the shaft 6, and supported in suitable bearings (not shown), similar to those for the shaft 46.

The lever 70 is yieldingly held with its roller 84 against the cam 85, by a torsion coil spring 92.

One end of the lever 71 has pivotally connected thereto a shoe 94 engaging an annular groove 96 in the outer circumference of the dog clutch 26. The other end of the lever 71 is in the form of a sector 97 having a number of teeth 98 adapted to be engaged by the teeth of a gear segment 102 on the shaft 86, and capable only of moving the sector 97 through a part of a revolution in either direction. A spring loaded detent 103 is mounted in the bracket 78 on the engine frame and tends to hold the lever 71 and with it the dog clutch 26 in a disengaged or an engaged position accordingly as it engages one or the other of two depressions 105 and 106, spaced from each other on the periphery of the sector 97.

In order to obviate any cocking of the clutch members consequent upon the application of a clutch engaging force at only one point at the periphery of the clutch members, each of the tubular cross shafts 46 and 86 may be provided with a cam and gear sector such as 115 and 132 (as shown in Fig. 2) duplicating on the opposite side of the propeller shaft 6, the cam 45 and gear sector 62, and the cam 85 and gear sector 102 on the shafts 46 and 86 respectively, for actuating levers and associated parts (not shown), similar to the levers 30, 31 and 70, 71, and which are moved of course, identically with their respective counterparts.

The shafts 46 and 86 of the "forward" and "reverse" shifting mechanism are connected by a roller chain 134, for which they are provided at one end with chain wheels 135 and 136 respectively. The ends of each of the shafts 46 and 86 to which the chain wheels 135 and 136 are connected are supported respectively by tubular spigots 138 and 139 formed on cover plates 140 and 141 of the engine frame, as shown in Figs. 2 and 6.

The roller chain 134 is driven by a sprocket wheel 142, above the chain wheel 135, and secured to the tubular spindle 143 of a worm wheel 144, which has a bearing 145 in the engine frame.

As shown best in Figs. 6 and 7, above the chain wheel 136 a sprocket 147 has a bearing on a spigot 149 which is eccentrically mounted on a plate 150. The plate 150 has a plurality of circumferentially disposed holes 151, through any of which it may be secured to the engine frame along with a cover plate 153, by bolts such as 154.

The roller chain 134 passes over the sprocket 147 which, because of the eccentric mounting of its spigot 149 on the plate 150, may be moved by turning of the plate 150 into different positions relatively to the engine frame and the bolts 154, to adjust the tension or take up slack in the chain 134.

The position of the brackets such as 35 and 75 about their pivot pins such as 37 and 77 can be varied within limits by means of adjusting screws such as 156 and 157 through the engine frame (as shown in Fig. 4), to adjust the position of the fulcrums 33 and 73 of the levers 30, 31 and 70, 71, to compensate for wear of the linings of the synchronizing clutches 20, 25 and 16, 24.

The worm wheel 144 is driven from a reversible electric motor 160, through a reduction gear comprising a pinion 161, and a gear wheel 162 having a splined coupling with the shaft 163 of a worm 164, as shown in Fig. 3.

In Fig. 1 the clutch members 25, 27, and 24, 26, are shown in a neutral position, in which no drive is transmitted from the engine crankshaft 1, to the propeller shaft 6. Figs. 4 and 5 show the levers such as 30, 31, and 70, 71 in a corresponding position.

Referring now to Figs. 8 to 10 showing various positions of the "reverse" drive clutches; in Fig. 8, the shaft 86 has been turned 55° in an anticlockwise direction from its position in Fig. 1. The roller follower 84 of the lever 70 is on the peak of the cam 85, and thereby the lever 70 has been turned about its fulcrum 73, fully engaging the synchronizing clutch members 16 and 24, and transmitting a "reverse" drive therethrough to the shaft 6.

In Fig. 9, the shaft 86 has been turned a further 31° (or 86° from neutral), and the contour of the cam 85 is such that the synchronizing clutch members 16 and 24 have been released slightly, allowing creeping of the dog clutch members 18 and 26 relatively to each other. It will be noted that the gear segment 102 is just about to engage the teeth 98 of the gear sector 97 of the lever 71.

In Fig. 10 the shaft 86 has been turned a still further 64° (or 150° from neutral); the gear segment 102 has turned the gear sector 97 from a position in which the spring loaded detent 103 engages the depression 105 and the dog clutch 18 and 26 is disengaged, to a position in which the detent 103 engages the depression 106 and the dog clutch 18 and 26 is fully engaged.

The sequence of movement of the "forward" drive clutches when moving from "neutral" into "forward" or "ahead" position is exactly similar to that just described for the "reverse" drive clutches.

The two shafts 46 and 86 turn together through the same angle because of their connection by the roller chain. They are turned through 150° in one direction from neutral to engage one of the dog clutches 18, 26 or 22, 27; back through 150° in an opposite direction, to neutral; and through a further 150° in that direction, to engage the other of the dog clutches 18, 26, or 22, 27. Thus the shafts are turned through a total of 300° between fully engaged positions of the clutches for forward and reverse drive respectively.

It will be observed that the cams and gear segments are such that through 150° of their rotation in either direction they leave one or the other of the sets of levers 30, 31 and 70, 71 entirely unaffected, so that throughout the operation of engagement and disengagement of the clutches for forward drive, the reverse clutches remain disengaged, and vice versa.

In order that the shafts 46 and 86 may be turned through the required 150° in either direction from neutral by the motor 160, a suitable control means for the motor 160 is provided. As shown in Figs. 14, 15 and 16, for a shunt wound motor, this consists of a main control switch 165, which is a single pole switch, capable of being closed in three different positions marked "N", "F", "R", to provide current paths corresponding to the three required positions of the clutch members for "neutral," "forward," and "reverse" respectively. A pair of magnetic contactors 166 and 167 which open switches 168 and 169 respectively when the "forward and "reverse" circuits are respectively closed by the switch 165 are provided with multiple contacts for reversing the motor 160 in well known manner.

The circuits provided by the switch 165 are automatically controlled by suitable timing cams 170, and 171, 172, on a shaft 174, driven at the same speed as the shafts 46 and 86 from a pinion 176 on the tubular spindle 143 of the worm wheel 144 through an idler 177 and a gear wheel 178 on the shaft 174 as shown in Figs. 2 and 3. The timing cams 170, 171 and 172 and their associated switches are shown diagrammatically in their "neutral" position in Figs. 11, 12 and 13.

The timing cam 170 controls limit switches 180 and 181, which are respectively opened to break the circuit and stop the motor 160 when the shafts 46 and 86, and hence the cam 170, have been turned through 150° from "neutral" in a "forward" direction and in a "reverse" direction.

The timing cams 171 and 172, control, switches 182 and 183 respectively, both of which are open when the shafts 46 and 86, and hence the cams 171 and 172, are in "neutral" position. Throughout movement of the shafts 46 and 86, and hence of the cams 171 and 172 from "neutral" through 150° in a "forward" direction and return to "neutral," the switch 182 is open and the switch 183 is closed, and vice versa during movement of the shafts 46 and 86 and hence of the cams 171 and 172 from "neutral" through 150° in a "reverse" direction and return to "neutral."

A pointer 185 is secured to the shaft 174 and in conjunction with a dial 186 shows at all times the position of the cams 170 and 171, 172, and hence the position of the "forward" and "reverse" clutches.

Movement of the main control switch 165 from "neutral" to "forward" position energizes the circuit of the motor 160 through the limit switch 180, the switch 169, and the magnetic contactor 166. The motor then turns in a forward direction, turning the shafts 46 and 86 in a clockwise direction (as seen in Figs. 1, 4 and 5), and the cams 170, and 171, 172 in a counter-clockwise direction (as seen in Figs. 3 and 11 to 16), through 150° when the "forward" drive dog clutch 22, 27 is fully engaged; at this point the limit switch 180 is opened by the cam 170, the circuit is broken and the motor 169 stops.

Movement of the main control switch 165 from "forward" to "neutral" position energizes the circuit of the motor 160 through the switch 183, limit switch 181, switch 168 and the magnetic contactor 167. The motor then turns in a reverse direction, returning the forward drive dog clutch to a neutral position; at this point the switch 183 is opened by the cam 172, the circuit is broken and the motor 160 stops.

If the main control switch is moved from "forward" straight over to "reverse" the circuit of the motor 160 will be energized through the limit switch 181, switch 168 and the magnetic contactor 167. The motor will turn the shafts 46 and 86 in an anti-clockwise direction (as seen in Figs. 1, 4 and 5) and the cams 170 and 171, 172 in a clockwise direction (as seen in Figs. 3 and 11 to 16) through 300°, when the "reverse" drive dog clutch 18, 26 is fully engaged; at this point the limit switch 181 is opened by the cam 170, the circuit is broken and the motor 160 stops.

Return to "neutral" from "reverse" is effected through the circuit provided by switch 182, limit switch 180, switch 169, and the magnetic contactor 166.

I claim:

1. In combination, a pair of gear wheels driven freely in opposite directions on a shaft common to both of them, and friction synchronizing and dog clutch means associated with each of said gear wheels and said shaft, constituting forward and reverse drive clutches for driving said shaft alternatively from one or the other of said gear wheels; said forward drive clutches being engaged and disengaged by shift levers with actuating means therefor on a turnable cross shaft and said reverse drive clutches being engaged and disengaged by shift levers with actuating means therefor on another turnable cross shaft; chain wheels on the cross shafts and a roller chain connecting the shafts together for like movement; said roller chain being driven by an electric servo motor.

2. The combination according to claim 1 in which the roller chain passes over a sprocket whose spigot is eccentrically mounted on a supporting plate, said supporting plate being turnable into different positions to adjust the tension in the roller chain.

3. The combination according to claim 1 in which the electric servo motor is reversible, and a simple manual three-way switch having positions corresponding to neutral, forward and reverse, controls the motor and movement of the clutches thereby into neutral forward and reverse positions; the motor being stopped by automatic switch means responsive to the position of the parts, when these positions have been reached.

4. In a marine propulsion system, in combination, an engine crankshaft rotating only in one direction, a propeller shaft with a propeller, the axis of the propeller shaft being at right angles to the axis of the crankshaft, a driving bevel wheel secured to the crankshaft, a pair of driven bevel wheels loose on the propeller shaft and constantly in mesh with the driving bevel wheel and driven in opposite directions thereby, and clutch means for transmitting the drive to the propeller shaft alternatively from one or the other of the driven bevel wheels to drive the propeller shaft in forward and reverse directions, there being an axial propulsion thrust in the propeller shaft in one direction or the other accordingly as the propeller shaft is being driven in a forward or reverse direction, the direction of rotation of the engine crankshaft and the helical hand of the propeller being such that in each instance said thrust is opposed by the thrust of the driving bevel wheel on that driven bevel wheel through which the propeller shaft is driven.

5. In combination, a pair of gear wheels driven freely in opposite directions on a shaft common to both of them, friction synchronizing and dog clutch means associated with each of said gear wheels and said shaft, constituting forward and reverse drive clutches for driving said shaft alternatively from one or the other of said gear wheels, shift levers for engaging and disengaging the clutches, and means for actuating said shift levers including a pair of turnable cross shafts, one for each of said forward and reverse drive clutches, each of said shafts being provided with a cam for the shift lever of the friction synchronizing clutch and a toothed gear segment for the shift lever of the dog clutch, said shift levers, cams and toothed gear segments being such that throughout the operation of engagement and disengagement of said forward drive clutches the reverse drive clutches remain disengaged, and vice-versa.

EDWARD V. RIPPINGILLE.

CERTIFICATE OF CORRECTION.

Patent No. 2,284,589. May 26, 1942.

EDWARD V. RIPPINGILLE.

It is hereby certified that error appears in the above numbered patent requiring correction as follows: In the heading to the printed specification, line 6, for "Serial No. 354,893" read --Serial No. 254,893--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.